(12) United States Patent
Douglas et al.

(10) Patent No.: US 9,545,581 B2
(45) Date of Patent: Jan. 17, 2017

(54) MOTION PLATFORM (71) Applicant: SEQUILIBRER PTY LTD, Victoria (AU)

(72) Inventors: Kenneth Edward Douglas, Queensland (AU); Stephen Graham Hoinville, Victoria (AU)

(73) Assignee: SEQUILIBRER PTY LTD., Blackburn, Victoria (AU)

(*) Notice: Subject to any disclaimer, the term of this patent is extended or adjusted under 35 U.S.C. 154(b) by 0 days.

(21) Appl. No.: 15/024,408

(22) PCT Filed: Sep. 26, 2014

(86) PCT No.: PCT/AU2014/050252
§ 371 (c)(1),
(2) Date: Mar. 24, 2016

(87) PCT Pub. No.: WO2015/042666
PCT Pub. Date: Apr. 2, 2015

(65) Prior Publication Data
US 2016/0236100 A1 Aug. 18, 2016

(30) Foreign Application Priority Data
Sep. 26, 2013 (AU) ................ 2013903712

(51) Int. Cl.
*A63G 31/16* (2006.01)
*G09B 9/14* (2006.01)
*G09B 9/02* (2006.01)

(52) U.S. Cl.
CPC ............... *A63G 31/16* (2013.01); *G09B 9/02* (2013.01); *G09B 9/14* (2013.01)

(58) Field of Classification Search
CPC ........ A63G 31/00; A63G 31/02; A63G 31/04; G09B 9/00; G09B 9/02; G09B 9/12; G09B 9/14; G09B 25/025
(Continued)

(56) References Cited

U.S. PATENT DOCUMENTS 5,009,412 A * 4/1991 Roodenburg .......... A63G 31/00
472/136
5,752,834 A 5/1998 Ling
(Continued)

FOREIGN PATENT DOCUMENTS

CN 102708723 A 10/2012

OTHER PUBLICATIONS

International Search Report issued in International Application No. PCT/AU2014/050252, mailed Oct. 27, 2014.
(Continued)

*Primary Examiner* — Kien Nguyen
(74) *Attorney, Agent, or Firm* — Hunton & Williams LLP (57) ABSTRACT

An apparatus for maintaining a support platform and a payload mountable thereon in near neutral equilibrium relative to a base structure. The support platform is spaced from the base structure by a plurality of actuators which provide the support platform with six degrees of freedom relative to the base structure about longitudinal, lateral and vertical axes. A substantially upright strut is mountable between the base structure and support platform for supporting the weight of the support platform and payload. First and second balance assemblies counteract forces imparted on the strut when the payload is moved or pivoted longitudinally and/or laterally. The forces counteracted by the first balance assembly and the second balance assembly reduce the load imparted on the actuators by the payload.

20 Claims, 6 Drawing Sheets (58) Field of Classification Search
USPC .......................... 472/58–61, 130; 434/29, 55
See application file for complete search history.

(56) References Cited

U.S. PATENT DOCUMENTS

| | | | | |
|---|---|---|---|---|
| 6,035,715 | A * | 3/2000 | Porter | G01M 7/02 73/432.1 |
| 6,038,940 | A * | 3/2000 | Rosheim | G09B 9/12 434/55 |
| 6,247,366 | B1 * | 6/2001 | Porter | G01M 7/02 73/432.1 |
| 6,431,987 | B1 * | 8/2002 | Tushar | B25J 17/0275 108/9 |
| 8,403,673 | B2 * | 3/2013 | Atluri | G09B 9/14 434/55 |
| 2010/0191500 | A1 | 7/2010 | Harrison et al. | |

OTHER PUBLICATIONS

Written Opinion issued in International Application No. PCT/AU2014/050252, mailed Oct. 27, 2014.

* cited by examiner

MOTION PLATFORM

CROSS REFERENCE TO RELATED APPLICATIONS

This application is the U.S. National Stage filing of International Application No. PCT/AU2014/050252, filed Sep. 26, 2014, which claims priority to Australian Provisional Application No. 2013903712, filed 26 Sep. 2013, the disclosures of which are hereby incorporated by reference.

FIELD OF THE INVENTION

The present invention relates to a motion platform. More specifically, the present invention relates to an apparatus for reducing the force required to implement movement in six degrees of freedom in a motion platform.

BACKGROUND TO THE INVENTION

Motion platforms, otherwise known as motion simulators, are used to simulate the sensation of being in a moving vehicle, for example an aircraft or motor car. Motion simulators typically comprise some form of enclosure, capsule or cockpit having one or more seats for occupants and a sound and visual display which is synchronised to the movement of the enclosure. The enclosure can be moved within a given working volume through an arbitrary trajectory in a 3 dimensional space. To facilitate such movement the enclosure is usually mounted on some form of supporting surface or platform having series of underlying actuators to impart motion, for example a Stewart platform.

Figure 1:
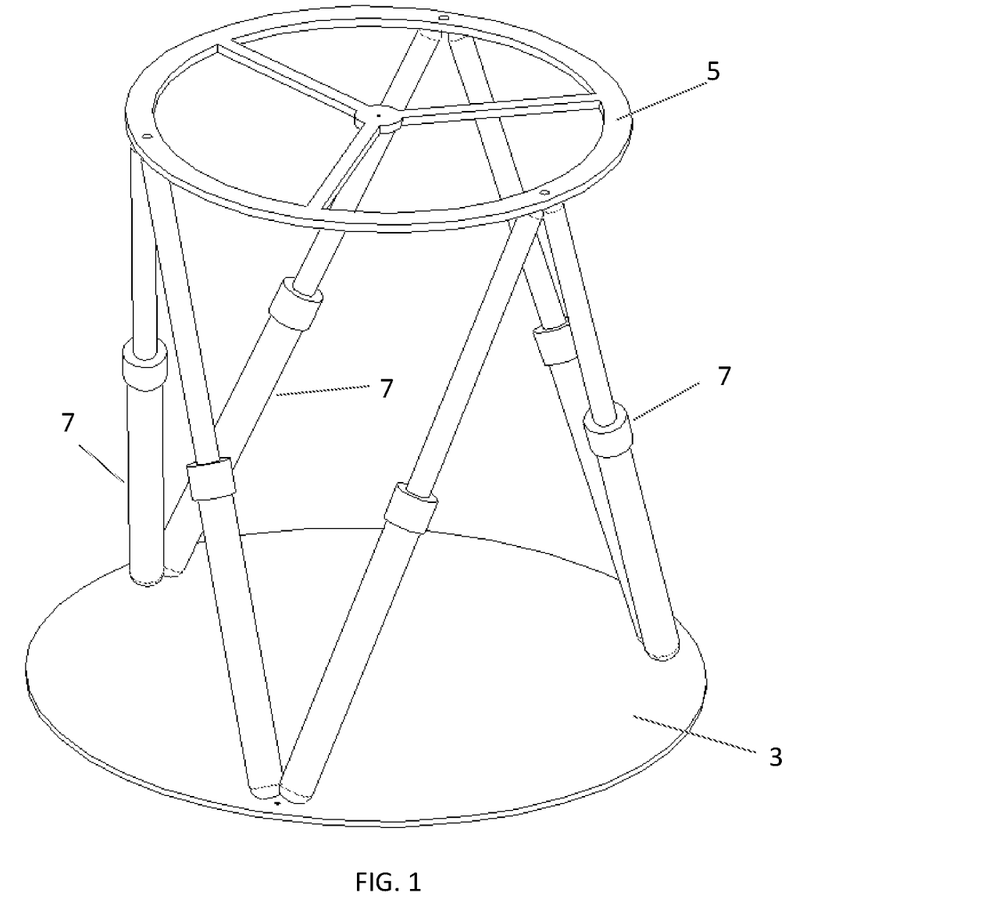
FIG. 1 is a perspective view of a motion platform (otherwise known as a Stewart platform) in accordance with the prior art.

Stewart platforms are well-known and permit movement with 6 degrees of freedom, i.e. independent and simultaneous translation and rotation about and along each of the three primary Cartesian axes X, Y and Z. A Stewart platform includes six legs each of which is extendible to translate and rotate a supporting platform about all three Cartesian axes. A typical Stewart platform, as shown in FIG. 1 of the accompanying drawings, includes a base structure 3 which is spaced from a support platform 5 by a plurality of extendible legs in the form of hydraulic, pneumatic, or electric actuators 7.

In existing motion simulators the entire weight of the enclosure, including the occupants, is supported solely by the actuators 7. The actuators 7 must therefore be adequately sized to support weight of the enclosure and impart the required motion.

SUMMARY OF THE INVENTION

In accordance with the first aspect of the invention there is provided an apparatus for maintaining a support platform and a payload mountable thereon in near neutral equilibrium relative to a base structure. The support platform is spaced from the base structure by a plurality of actuators which provide the support platform with six degrees of freedom relative to the base structure about longitudinal, lateral and vertical axes. The apparatus includes a substantially upright strut mountable between the base structure and support platform for supporting the weight of the support platform and payload. The apparatus further includes a first balance assembly for counteracting forces imparted on the strut when the payload is moved longitudinally and/or laterally with respect to the base structure. The apparatus further includes a second balance assembly for counteracting forces imparted on the support platform when the payload is pivoted about the longitudinal and/or lateral axes with respect to the base structure. The forces counteracted by the first balance assembly and the second balance assembly reduce the load imparted on the actuators by the payload.

The first balance assembly preferably includes three or more resilient members connected between the strut and the base structure. In this respect, the resilient members may extend outwardly from the strut and be angularly spaced apart a substantially equal distance on the base structure.

The base structure may include three or more outwardly and upwardly extending mounting arms which are angularly spaced apart a substantially equal distance. Each resilient member may have one end secured to a corresponding mounting arm.

Each resilient member preferably includes one or more elastic elements, for example elastic cords, which may extend back and forth between the strut and the mounting arm.

The strut preferably includes a main housing pivotally mounted to the base structure, and a cylinder vertically displaceable with respect to the main housing. The strut may further include a frame structure positioned around the main housing and the cylinder.

In one embodiment, the elastic cords of the resilient members are secured to the main housing. In other embodiments, the one or more of the elastic cords can be secured to the frame structure or the cylinder, the cylinder and the main housing, or any combination of the frame structure, cylinder and main housing.

The second balance assembly preferably includes three or more tether lines having a first end connected to the support platform or the payload, and a second end connected to the strut. The tether lines are preferably angularly spaced apart a substantially equal distance on the support platform or payload.

The frame structure of the strut may include an upper end secured to the cylinder and a lower end which extends around the main housing. The lower end preferably includes a plurality of rollers, slider or the like which can travel on an outer surface of the main housing when the cylinder is vertically displaced with respect to the main housing. The second end of each tether line is preferably secured to the lower end of the frame structure.

The second balance assembly may further include a plurality of upper pulleys or sprockets mounted on the outer surface of the main housing, and a plurality of lower pulleys or sprockets mounted on the base structure. Each tether line can thereby pass from the support platform or payload, under a lower pulley or sprocket and then over an upper pulley or sprocket before passing to the lower end of the frame structure.

Each tether line preferably includes a resilient section which is arranged end to end with a non-resilient section. In this respect, the non-resilient section of the tether line is preferably a cable, and the resilient section of the tether line preferably includes one or more elastic cords. In this respect, the one or more elastic cords may extend back and forth between opposing first and second mounting blocks of the resilient section.

The support platform preferably includes an upper section and a lower section. In this respect, the lower section is preferably able to swivel with respect to the upper section. The first mounting block of each tether line of the second balance assembly is preferably mounted to the lower section of the support platform.

In accordance with another aspect of the invention there is provided a motion platform including:

a base structure;

a support platform for mounting a payload thereon;

a plurality of actuators connected between the base structure and the support platform, the actuators providing the support platform with six degrees of freedom relative to the base structure about longitudinal, lateral and vertical axes;

a substantially upright strut mounted between the base structure and support platform for supporting the weight of the support platform and payload;

a first balance assembly for counteracting forces imparted on the strut when the payload is moved longitudinally and/or laterally with respect to the base structure, and a second balance assembly for counteracting forces imparted on the support platform when the payload is pivoted about the longitudinal and/or lateral axes with respect to the base structure, wherein the forces counteracted by the first balance assembly and the second balance assembly reduce the load imparted on the actuators by the payload.

The present invention advantageously enables a payload, for example, the enclosure, capsule or cockpit of a motion simulator to be moved with minimal effort on the part of the actuators due to all or a substantial portion of the weight of the payload being removed from the actuators. In this respect the upright strut supports the weight of the support platform and payload, the first balance assembly provides a force to the strut that is the opposite vector to the movement of the strut, and the second balance assembly provides a force to the support platform that partially or totally cancels out the overturning force acting upon the support platform by the payload.

Further, the present invention advantageously enables the support platform and payload to be maintained in a state of neutral or near neutral balance or equilibrium over the payload's full range of movement. In this respect, the forces counteracted by the first and second balance assemblies provide stability and balance to the payload such that the actuators used to impart motion to the payload can be smaller, thereby enabling actuators of lower cost to be utilised. The payload can therefore be maintained in a tilted or offset position with minimal load on the actuators.

BRIEF DESCRIPTION OF THE DRAWINGS

Further benefits and advantages of the present invention will become apparent from the following description of the preferred embodiments of the invention. The preferred embodiments should not be considered as limiting any of the statements in the previous section. In the drawings.

DESCRIPTION OF THE PREFERRED EMBODIMENTS

With reference to FIGS. 2 to 6 of the accompanying drawings there is shown a motion platform incorporating a balance mechanism or apparatus 1 for maintaining a support platform 5, and a payload mountable thereon, in substantially neutral balance or equilibrium relative to a base structure 3. The support platform 5 is spaced from the base structure 3 by a plurality of actuators 7 which provide the support platform 5 with six degrees of freedom relative to the base structure 3 about longitudinal, lateral and vertical axes, X, Y and Z respectively.

The apparatus 1 includes one or more substantially upright struts 9 mountable between the base structure 3 and the support platform 5. The strut 9 supports the substantial weight of the platform 5 and associated payload thereon. The payload typically includes one or more occupants in some form of enclosure, capsule or cockpit having one or more seats, a visual display and controls which represent the ride being simulated.

The apparatus 1 further includes a first balance assembly 11 for counteracting forces imparted on the strut 9 when the payload is moved longitudinally and/or laterally with respect to the base structure 3 by the actuators 7. The apparatus 1 further includes a second balance assembly 13 for counteracting forces imparted on the support platform 5 when the payload is pivoted about the longitudinal and/or lateral axes with respect to the base structure 3 by the actuators 7.

Figure 2:
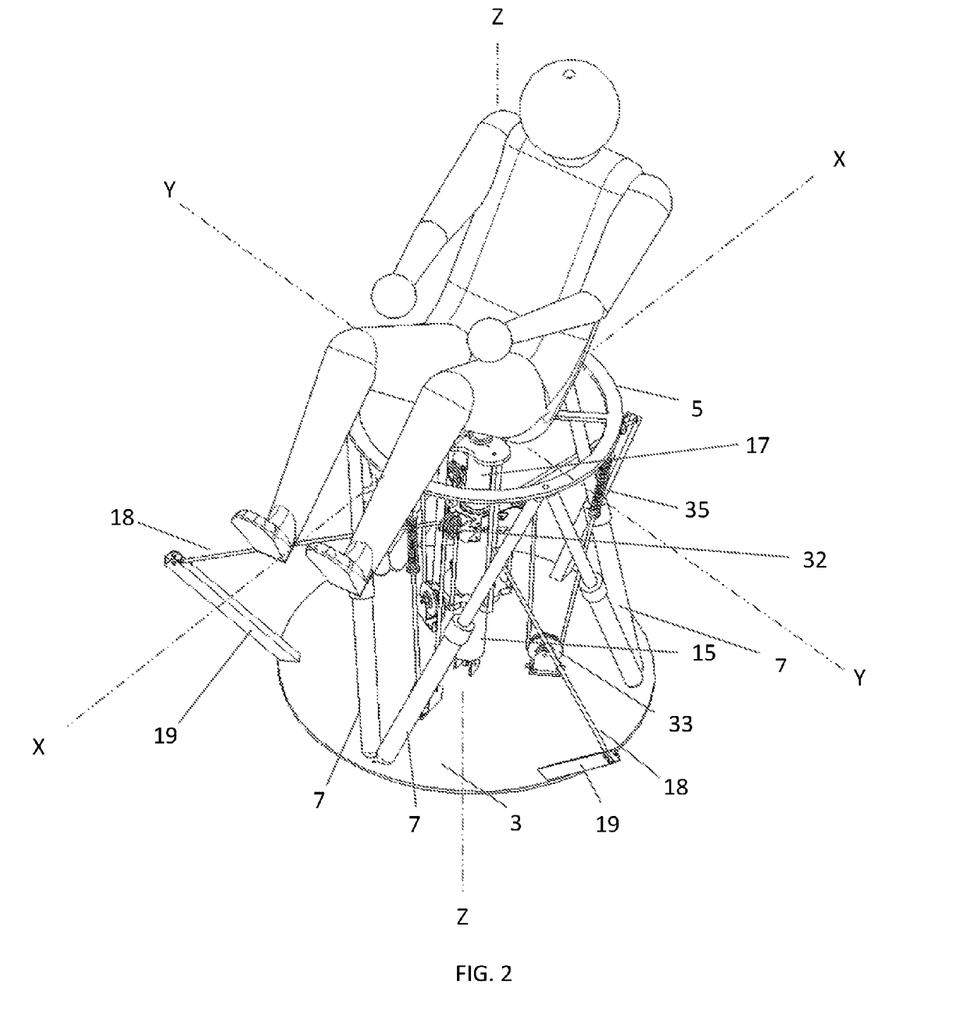
FIG. 2 is a perspective view of the apparatus in accordance with an embodiment of the invention, incorporated into the motion platform illustrated in FIG. 1.

With reference to FIG. 2, the support platform 5 and associated payload can be moved by actuators 7 to rotate the payload in roll (rotation about the X axis), pitch (rotation about the Y axis) and yaw (rotation about the Z axis). The actuators 7 also permit translation in the three perpendicular axes X, V and Z for movement forwards, backwards, left and right, and up and down.

The strut 9 functions to support the substantial weight of the support platform 5 and payload. The strut 9 may be a "zero rate" spring, for example a low rate metal or an elastomeric spring tuned to exert a force approximately equal to the weight of the support platform 5 and payload. A low spring rate is advantageous in reducing the change in force provided in respect of change in vertical displacement. Preferably, the strut 9 is pneumatic and is used with a programmable logic controller or similar that can measure the weight of the support platform 5 and payload and adjust the pressure dynamically. This is particularly advantageous in dealing with variations in payload mass. The strut 9 may include a main housing 15 pivotally mounted to the base structure 3, and a cylinder 17 vertically displaceable with respect to the main housing 15. In response to vertical displacement of the support platform 5 by the actuators 7 and/or changes in the weight of the support platform 5 and payload thereon, the amount of fluid within the main housing 15 is adjusted accordingly in order that the strut 9 provides constant or near constant support for the payload at all times. The support platform 5 may be pivotally mounted to a top region of the cylinder 17. Preferably, the strut 9 further includes a frame structure 25 having an upper plate-like end 27 secured to the cylinder 17 and a lower plate-like end 29 which extends around the main housing 15. The frame structure 25 further includes a plurality of elongate bars positioned between the upper and lower plate-like ends 27, 29.

The vertical strut 9 is pivotally mounted to the base structure 3. The first balance assembly 11 stabilises the strut 9 by providing lateral-longitudinal balance. In this respect, the first balance assembly 11 provides a counteracting force to the strut 9 when the support platform 5 and payload is moved longitudinally and/or laterally with respect to the base structure 3.

Figure 3:
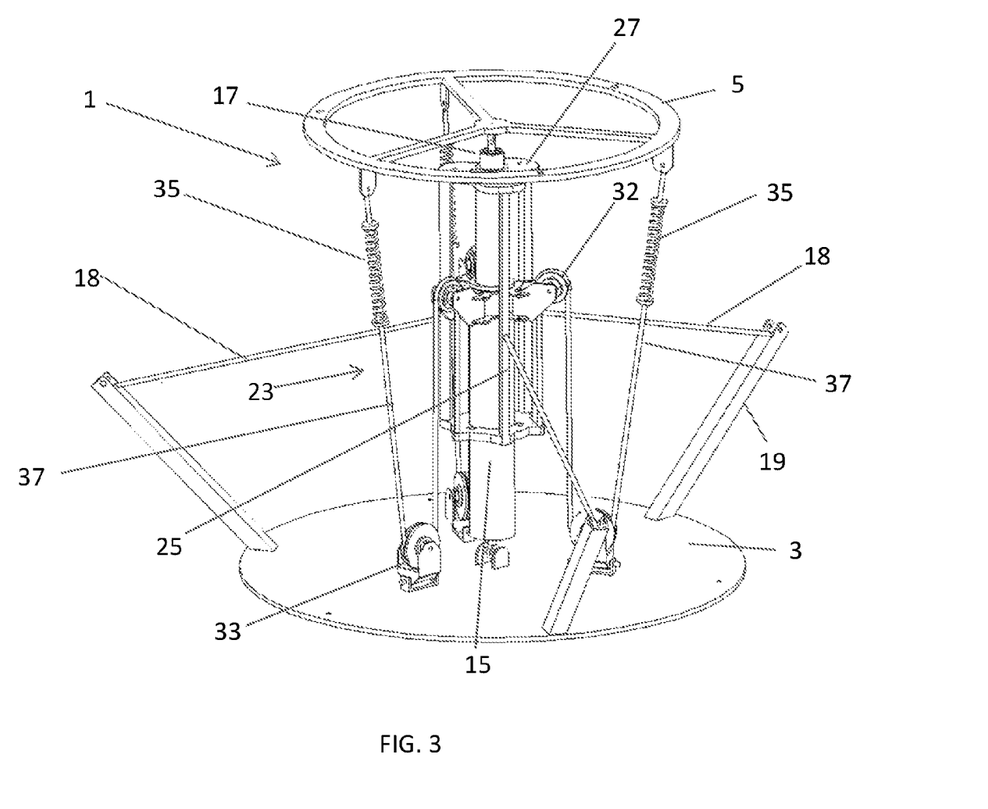
FIG. 3 is a perspective view of the apparatus illustrated in FIG. 2 with the actuators of the motion platform omitted.

The first balance assembly 11 preferably includes three or more resilient members 18 connected between the strut 9 and the base structure 3. As best seen in FIG. 3, the resilient members 18 extend outwardly and downwardly from the strut 9 and are angularly spaced apart a substantially equal distance on the base structure 3. In this respect, the base structure 3 includes three or more outwardly and upwardly extending mounting arms 19 which are angularly spaced apart a substantially equal distance. A first end of each resilient member 18 is attached to the strut 9 with an opposite second end secured to a distal end of the mounting arm 19. By mounting the resilient members 18 on the mounting arms 19, the resilient members 18 are more horizontally orientated. As the vertical strut 9 is tilted from the vertical upright position, the resilient members 18 collectively provide a counter balancing force. By the selection of appropriate spring rates for the resilient members 18, the overturning force can be largely or totally cancelled out. Equal resilient members 18 arranged with equal angular separation to give a zero force vector when the strut 9 is vertical is desirable, but other offsets and biases can be chosen for specific applications. Although it is desirable to have resilient members 18 angularly spaced apart a generally equal distance, the resilient members 18 can be more randomly spaced provided that the resilient members 18 still collectively provide a zero force vector when the strut 9 is in the desired position.

Figure 4:
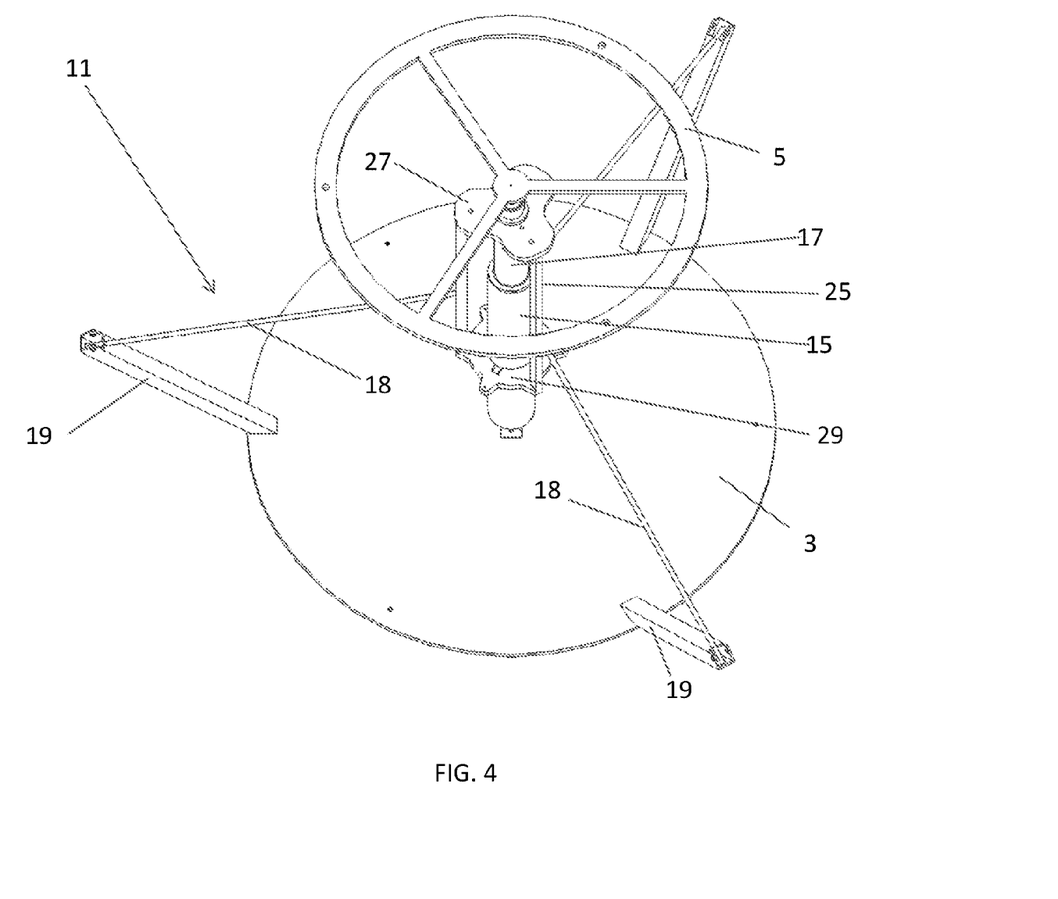
FIG. 4 is a top perspective view of the apparatus shown in FIG. 3, with the second balance assembly also omitted.

In a particularly preferred embodiment of the motion platform each resilient member 18 includes one or more elastic elements, for example elastic cords 21 which extend between the strut 9 and the mounting arm 19. By changing the rate or spring constant or adjusting the height of the mounting of the resilient members 18 on the mounting arms 19 of the base structure 3, allowances can be made for changes in payload mass which can be considerable depending upon the number and size of occupants in the payload. In FIGS. 2, 3 and 4, each resilient member 18 is illustrated as a singular element. However each resilient member 18 shown may include one or a multiple number of elastic elements extending between the strut 9 and the mounting arm 19. A first end of each resilient member 18 is mounted to a corresponding elongate bar of the frame structure 25. As a result, the first end of each resilient member 18 moves with the frame structure 25 and cylinder 17 during vertical displacement of the cylinder 17 with respect to the main housing of the strut 9. However, in other embodiments the first end of each resilient member 18 can be mounted to the main housing 15 of the strut 9 such that the first end of each resilient member 18 remains stationary during vertical displacement of the cylinder 17.

The second balance assembly 13 provides roll-pitch balance by providing a counteracting force to the support platform 5 when the payload rolls or pitches. In this respect, the second balance assembly 13 preferably includes three or more tether lines 23 having a first end connected to the support platform 5, or alternatively the payload, and a second end connected to the strut 9. As shown in FIG. 3, the tether lines 23 are preferably angularly spaced apart an equal distance on the support platform 5. In the embodiment shown in FIG. 6, the lower plate-like end 29 includes a plurality of rollers 31 which travel along an outer surface of the main housing 15 when the cylinder 17 and frame structure 25 is vertically displaced with respect to the main housing 15.

Figure 5:
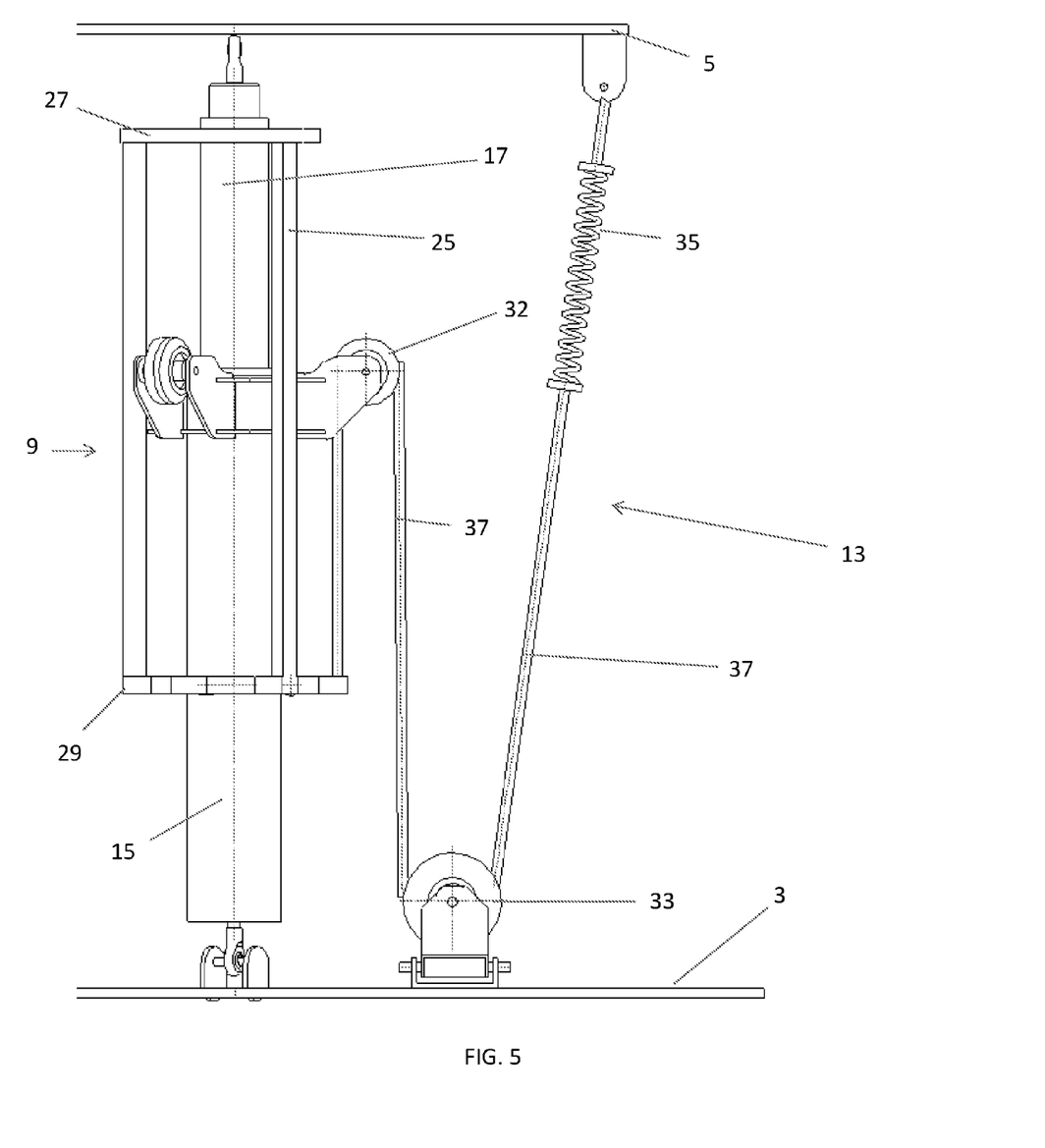
FIG. 5 is a side view illustrating the strut and various features of a portion of the second balance assembly.
Figure 6:
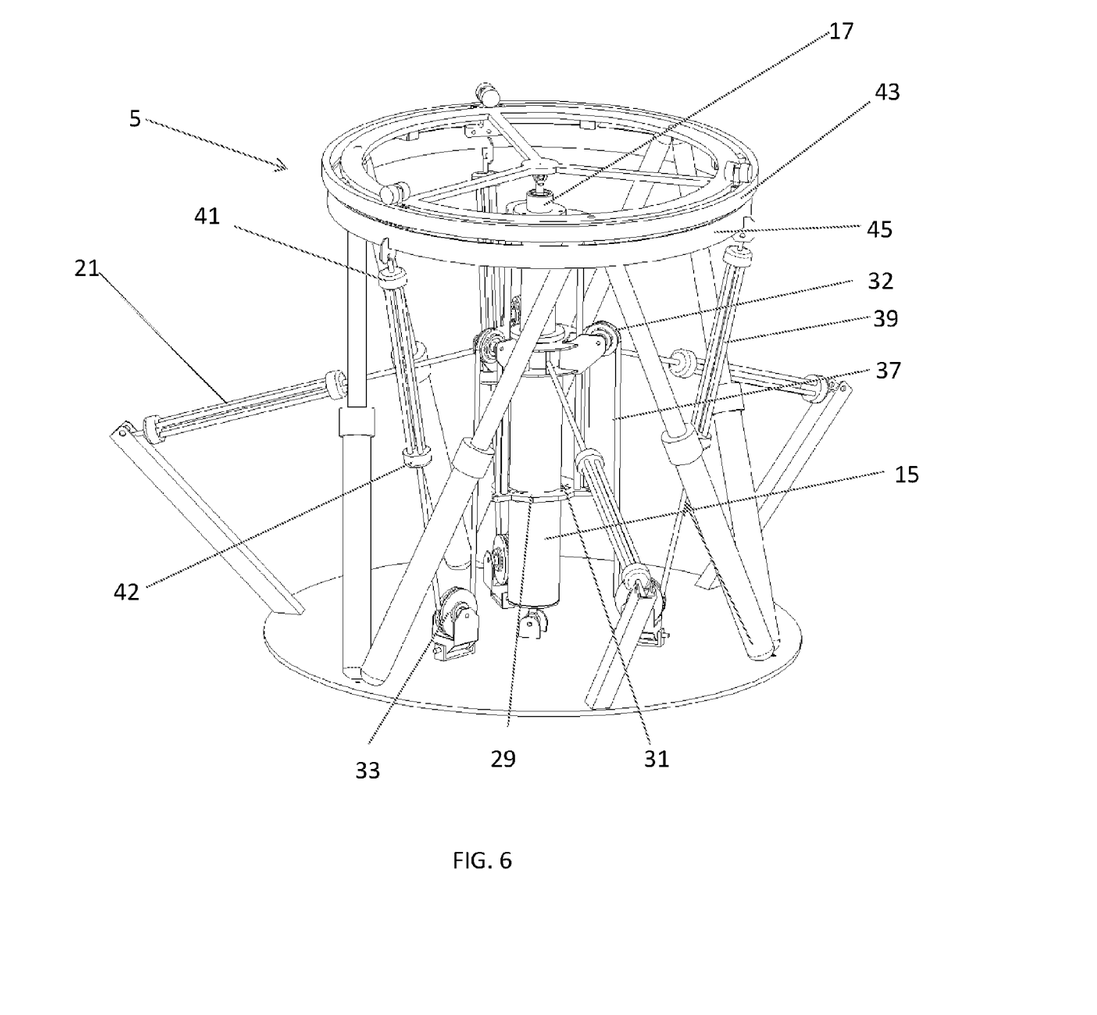
FIG. 6 is a perspective view of the apparatus in accordance with a further embodiment of the invention, incorporated into a motion platform having a two-part support platform.

As shown in the embodiments depicted in FIGS. 5 and 6, the second balance assembly 13 may further include three or more upper pulleys 32 evenly spaced around the outer surface of the main housing 15, and three or more lower pulleys 33 evenly spaced on the base structure 3. Each lower pulley 33 is aligned with a corresponding upper pulley 32. The tether lines 23 pass from the support platform 5, under a lower pulley 33 then over a corresponding upper pulley 32 before passing to the lower end 29 of the frame structure 25.

Each tether line 23 preferably includes a resilient section 35 and a non-resilient section 37. In this respect, the resilient section 35 is preferably arranged end to end with the non-resilient section 37 with the non-resilient section 37 passing around the upper and lower pulleys 32, 33. The non-resilient section 37 is preferably a cable, for example a wire cable. If the non-resilient section 37 is in the form of a chain, for example a roller chain or the like, the lower pulleys 33 and the upper pulleys 32 can be replaced with sprockets.

The resilient section 35 of the tether line 23 preferably includes one or more elastic cords 39, as shown in FIG. 6, which extend between opposing first and second mounting blocks 41, 42 of the resilient section 35. In this regard, the first mounting block 41 is preferably mounted to the support platform 5 with the second mounting block 42 being mounted to an end of the non-resilient section 37 of the tether line 23. The elastic cords 39 are held in tension with the second mounting block 42 being pulled away from the first mounting block 41 by the non resilient section 37 of the tether line 23. By changing the spring rate of the cords and/or adjusting the position of the first mounting block 41 on the support platform 5, allowances can be made for changes in payload or occupant mass. Although multiple elastic cords 39 are provided in the embodiment shown in FIG. 6, a singular elastic cord which extends back and forth multiple times between the opposing first and second mounting blocks 41, 42 could instead be used. A tether line 23 such as that described above could also be used as a resilient member 18 for the first balance assembly 11, as shown in FIG. 6.

The arrangement of the non-resilient section 35 of the tether line 23 over the upper and lower pulleys 32, 33 ensures that the resilient section 35 of the tether line 23 remains largely unaffected during longitudinal, lateral and vertical displacement of the support platform 5 and payload.

In a particularly preferred embodiment, the support platform 5 includes an upper section 43 and a lower section 45, as illustrated in FIG. 6. The payload is mounted to the upper section 43. The lower section 45 is preferably in the form of a ring which is able to swivel with respect to the upper section 43 and is thereby isolated or decoupled from yaw rotation of the payload. In this respect, the first mounting block 41 of the non-resilient section 37 is preferably secured to the lower section 45 of the support platform 5 such that yaw rotation of the payload does not significantly impact upon the second balance assembly 13. The upper section 43 of the support platform 5 is free to rotate about the vertical axis with respect to the lower section 45.

The combined effect of the strut 9 and first and second balance assemblies 11, 13 make it possible for the payload on the support platform 5 to remain substantially balanced in all positions and orientations. In other words, the payload can be held in a state of neutral equilibrium or near neutral equilibrium and can stay stable and at rest in all positions and orientations without imparting significant load on the actuators 7. Accordingly, the actuators 7 can be sized to merely move the payload rather than support the payload. The apparatus 1 can also be packaged entirely within the confines of an existing Stewart platform and can be largely or totally passive in its operation.

As the present invention may be embodied in several forms without departing from the essential characteristics of the invention, it should be understood that the above-described embodiments should not be considered to limit the present invention but rather should be construed broadly. Various modifications and equivalent arrangements are intended to be within the spirit and scope of the invention.

The claims defining the invention are as follows:

1. An apparatus for maintaining a support platform and a payload mountable thereon in near neutral equilibrium relative to a base structure, the support platform being spaced from the base structure by a plurality of actuators which provide the support platform with six degrees of freedom relative to the base structure about longitudinal, lateral and vertical axes, the apparatus comprising:
   a substantially upright strut mountable between the base structure and support platform for supporting the weight of the support platform and payload,
   a first balance assembly for counteracting forces imparted on the strut when the payload is moved longitudinally and/or laterally with respect to the base structure,
   a second balance assembly for counteracting forces imparted on the support platform when the payload is pivoted about the longitudinal and/or lateral axes with respect to the base structure,
   wherein the forces counteracted by the first balance assembly and the second balance assembly reduce the load imparted on the actuators by the payload.

2. The apparatus of claim 1 wherein the first balance assembly comprises three or more resilient members connected between the strut and the base structure.

3. The apparatus of claim 2 wherein the resilient members extend outwardly from the strut and are angularly spaced apart a substantially equal distance on the base structure.

4. The apparatus of claim 3 wherein the base structure comprises three or more outwardly and upwardly extending mounting arms which are angularly spaced apart a substantially equal distance, each resilient member having one end secured to a corresponding mounting arm.

5. The apparatus of claim 4 wherein each resilient member comprises one or more elastic cords which extend between the strut and the mounting arm.

6. The apparatus of claim 5 wherein the strut comprises a main housing pivotally mounted to the base structure, and a cylinder vertically displaceable with respect to the main housing.

7. The apparatus of claim 6 wherein the strut further comprises a frame structure positioned around the main housing and the cylinder.

8. The apparatus of claim 7 wherein the one or more elastic cords of the resilient members are secured to the frame structure of the strut.

9. The apparatus of claim 7 wherein the second balance assembly comprises three or more tether lines having a first end connected to the support platform or payload and a second end connected to the strut.

10. The apparatus of claim 9 wherein the tether lines are angularly spaced apart a substantially equal distance on the support platform or payload.

11. The apparatus of claim 10 wherein the frame structure comprises an upper end secured to the cylinder and a lower end extending around the main housing.

12. The apparatus of claim 11 wherein the lower end comprises a plurality of rollers for travelling along an outer surface of the main housing when the cylinder is vertically displaced with respect to the main housing.

13. The apparatus of claim 12 wherein the second balance assembly further comprises a plurality of upper pulleys mounted on the outer surface of the main housing, and a plurality of lower pulleys mounted on the base structure, each tether line passing over an upper pulley and under a lower pulley.

14. The apparatus of claim 11 wherein the second end of each tether line is secured to the lower end of the frame structure.

15. The apparatus of claim 9 wherein each tether line comprises a resilient section arranged end to end with a non-resilient section.

16. The apparatus of claim 15 wherein the resilient section of the tether line comprises one or more elastic cords which extend between opposing first and second mounting blocks of the resilient section.

17. The apparatus of claim 16 wherein the support platform comprises an upper section and a lower section, the lower section being able to swivel with respect to the upper section.

18. The apparatus of claim 17 wherein the first mounting block is mounted to the lower section of the support platform.

19. The apparatus of claim 6 wherein the one or more elastic cords of the resilient members are secured to the main housing of the strut.

20. A motion platform comprising:
   a base structure;
   a support platform for mounting a payload thereon;
   a plurality of actuators connected between the base structure and the support platform, the actuators providing the support platform with six degrees of freedom relative to the base structure about longitudinal, lateral and vertical axes;
   a substantially upright strut mountable between the base structure and support platform for supporting the weight of the support platform and payload,
   a first balance assembly for counteracting forces imparted on the strut when the payload is moved longitudinally and/or laterally with respect to the base structure,
   a second balance assembly for counteracting forces imparted on the support platform when the payload is pivoted about the longitudinal and/or lateral axes with respect to the base structure,
   wherein the forces counteracted by the first balance assembly and the second balance assembly reduce the load imparted on the actuators by the payload.

* * * * *